United States Patent [19]

Kikuchi et al.

[11] Patent Number: 4,906,697

[45] Date of Patent: Mar. 6, 1990

[54] RUBBER COMPOSITIONS FOR TIRE TREADS

[75] Inventors: Yasushi Kikuchi, Odawara; Kazuyoshi Kayama, Yokohama; Takao Muraki, Hiratsuka, all of Japan

[73] Assignee: Yokohama Rubber Co., Ltd., Tokyo, Japan

[21] Appl. No.: 216,684

[22] Filed: Jul. 8, 1988

[30] Foreign Application Priority Data

Jul. 10, 1987 [JP] Japan .................................. 62-171249

[51] Int. Cl.$^4$ .......................... C08L 7/00; C08L 9/00; C08L 9/06
[52] U.S. Cl. .................................... 525/237; 524/526; 525/236
[58] Field of Search ....................... 525/237, 316, 236; 524/526

[56] References Cited

U.S. PATENT DOCUMENTS

| | | | |
|---|---|---|---|
| 4,383,085 | 5/1983 | Fujimaki et al. | 525/237 |
| 4,485,205 | 11/1984 | Fujimaki et al. | 525/237 |
| 4,530,959 | 7/1985 | Armbruster et al. | 525/237 |

FOREIGN PATENT DOCUMENTS 57-55204  4/1982  Japan .
57-73030  5/1982  Japan .

*Primary Examiner*—Allan M. Lieberman
*Attorney, Agent, or Firm*—Finnegan, Henderson, Farabow, Garrett & Dunner

[57] ABSTRACT

Rubber compositions for use in tire treads are disclosed which are essentially made up of natural and/or a selected class of polyisoprene rubbers of specified cis contents and a selected class of styrene-butadiene rubbers of specified styrene and 1,2-bond contents. The composition has a unique viscoelasticity curve, exhibiting sufficient wet skid resistance and adequate fuel saving.

3 Claims, 2 Drawing Sheets

RUBBER COMPOSITIONS FOR TIRE TREADS

BACKGROUND OF THE INVENTION

1. Field of the Invention

This invention relates to rubber compositions particularly for use in automobile tire treads.

2. Prior Art

To cope with the advent of expressway networks or sophisticated automobiles, tire grip on dry or wet roads is a great concern from the safe driving point of view. Such tire quality is closely associated with frictional resistance between the tread and the road. The tread rubber should to this end be highly resistant to friction against the road surface, which resistance is dependent upon the magnitude of hysteresis loss due to the tread being periodically deformed while in high-speed, frictional contact with irregularities on the road. Hysteresis loss is known to be fairly correlative to a certain loss factor (tan $\delta$) determined by dynamic viscoelasticity at a temperature of about 0° C. in a frequency band of 10 to 20 Hz. To improve tire grip, therefore, involves the use of a tread rubber having increased tan 67 in the vicinity of 0° C.

Fuel economy is another yet important tire quality with respect to the resource- and energy-saving requirements. This quality, generally dominated by rolling friction of the tire, has been found obtainable with a tread rubber being rendered small in respect of hysteresis loss, hence loss factor, and eventually rolling resistance at from 50° to 70° C. at which the tire is run.

To attain enhanced tire grip and fuel saving characteristics, automobile tire manufacturers have made great efforts to develop an improved rubber material capable of providing a good balance of loss factors, higher tan $\delta$ at about 0° C. and lower tan $\delta$ at from 50° to 70° C., at from 10 to 30 Hz.

Vinyl-rich polybutadiene rubber (V-BR) has been proposed which is abundant in 1,2-bond content, generally more than 40%, as taught for instance in Japanese Patent Laid-Open Publication No. 55-12133 and No. 56-127650. V-BR, though acceptable in wet skid resistance and also in rolling resistance, is readily susceptible to abrasion and destruction.

Two types of vinyl-rich styrene-butadiene rubber (V-SBR) are disclosed in Japanese Patent Laid-Open Publication No. 57-55204 and No. 57-73030. One such rubber has a 1,2-bond content of 42 to 70% and a styrene content of 10 to 30%, whereas the other is 60 to 95% in 1,2-bond content and 3 to 30% in styrene content. The first mentioned V-SBR excels in mechanical strength compared to V-BR, but suffers from insufficient tire grip and inadequate rolling resistance. While the last mentioned V-SBR, because of is high glass transition temperature, is effective in improving tire grip, it fails to fully produce such beneficial effect when blended with natural rubber (NR) or polyisoprene rubber (IR). This is because too much 1,2-bond renders the rubber blend compatible.

SUMMARY OF THE INVENTION

It has now been found that selected V-SBR rubbers of specified 1,2-bond and styrene contents when combined with NR and/or IR can exhibit unique viscoelasticity characteristics.

The present invention seeks to provide a new and improved rubber composition suitable for tread formation which excels in skid resistance on dry and wet roads and also in fuel economy, thus ensuring safe driving at high speed.

According to the invention, there is provided a rubber composition for use in tire treads which comprises (a) natural rubber or polyisoprene rubber or both, the polyisoprene rubber having a cis content of not less than 80%, and (b) styrene-butadiene copolymer rubber having a styrene content of 5 to 50% and a 1,2-bond content of 60 to 73%, the copolymer rubber resulting from solution polymerization in the presence of an organic lithium compound catalyst, whereby the composition has a bimodal curve between the loss factor and the temperature as determined by dynamic viscoelasticity.

DETAILED DESCRIPTION OF THE INVENTION

Rubber compositions according to the present invention are essentially comprised of either one or both of natural rubber (NR) and a selected class of polyisoprene rubbers (IR), and a selected class of styrene-butadiene copolymer rubbers (SBR).

SBR useful for the purpose of the invention include styrene-butadiene rubbers having 1,2-bond contents in the range of 60 to 73% as infrared-spectrophotometrically measured by the Hampton method. SBR if greater 1,2-bond contents than 73%, given adequate tire grip when used alone, would show a decline in this quality when blended with NR and/or IR. This appears to be inconsistent to art-recognized knowledge that the higher the 1,2-bond content is, the greater loss factor at 0° C. and the better tire grip. On close examination of the viscoelastic properties of rubbers against temperatures, it has further been found that a monomodal viscoelasticity curve is obtained from a rubber composition formulated with SBR of a 1,2-bond content more than 73% and with NR and/or IR of a cis content greater than 80%. By the term monomodal curve is meant a curve designating a compatible rubber blend. To be more specific, SBR of too much 1,2-bond when used alone has a loss factor peak on a high-temperature side with tan $\delta$ being increased at 0° C., contributing to acceptable tire grip. Where this SBR rubber is combined with NR and/or IR, however, the peak tends to shift toward a low-temperature side, resulting in reduced tan $\delta$ at 0° C.

A blend of SBR of a 1,2-bond content smaller than 73% with NR and/or IR shows a bimodal curve between the loss factor and the temperature. This is taken to mean that the blend is of an incompatible nature taking advantage of a high-temperature peak of SBR.

Advantageously, SBR of a 1,2-bond content of 60 to 73% contemplated under the invention enables a peak temperature of tan $\delta$ to rise beyond a certain level, leading to increased tan $\delta$ at 0° C., when blended with NR and/or IR of a cis content not less than 80%. SBR of this type even when used alone or in a blend renders tan $\delta$ small at from 50° to 70° C. which indicates fuel saving as compared to too much 1,2-bond SBR.

SBR of smaller 1,2-bond contents than 60% blended with NR and/or IR, given an incompatible curve, invites too low a peak temperature and hence inadequate tire grip.

Figure 1:
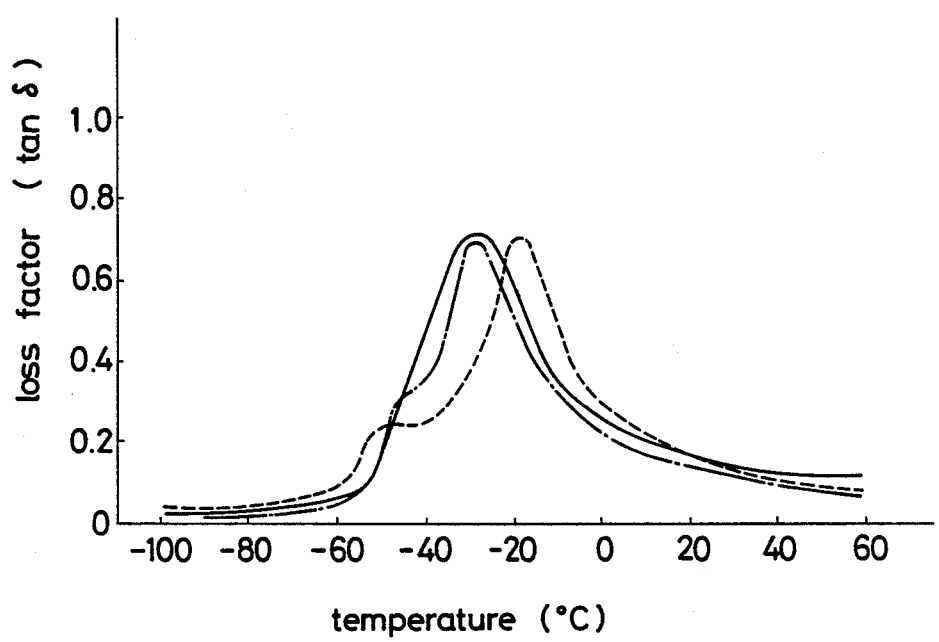
FIG. 1 is a graphic representation showing the loss factor-temperature curves of the rubber composition provided in accordance with the present invention and also of comparative compositions.

FIG. 1 shows the loss factor-temperature curves drawn from the three different SBR-NR and/or IR blends as referred to above.

Figure 2:
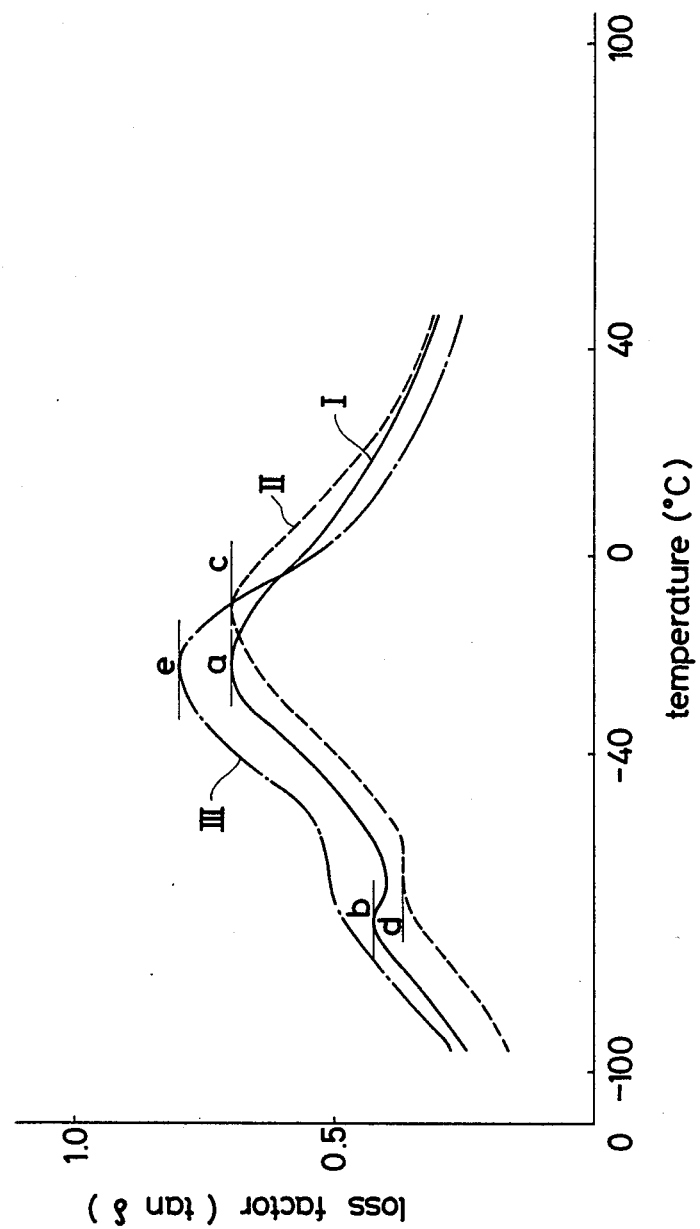
FIG. 2 is a graphic representation explanatory of the shape of viscoelasticity curves.

The monomodal and bimodal curves here used will be explained having regard to FIG. 2. Curve III, viewed as having one tangent line e at which the peak temperature of tan δ is zero in differential coefficient, is called a monomodal or single-peak curve. Curves I and II are so shaped as to be zero in differential coefficient, respectively, at two tangential lines a and b, and c and d. The latter two curves are bimodal or two-peak curves.

The styrene content in SBR should be in the range of 5 to 50%. SBR if smaller styrene contents than 5% would not be effective for improving tire grip and if larger styrene contents than 50% would lead to inadequate fuel saving and insufficient abrasion resistance, making the finished tread too hard and hence less resistant at low temperature.

Eligible IR rubbers should have a cis content of 80% or greater. Smaller cis contents would show no appreciable rise in fuel saving and abrasion resistance.

In the practice of the invention, blend ratios of NR and/or IR to SBR are optional, provided that the resulting composition is bimodal in its loss factor-temperature curve. The Mooney viscosity of SBR may be feasible in the range of 15 to 150, preferably 30 to 80 at $ML_{1+4}(100°\ C.)$. No particular restriction is imposed on the styrene sequence and coupling of SBR and the bonding of functional groups to the polymer chain. SBR may be produced for example by solution polymerization with use of an organic lithium compound such as an alkyl lithium compound as the catalyst.

Various other additives may be employed which include carbon black, vulcanization agents, vulcanization accelerators, antioxidants, softeners, plasticizers, fillers and the like.

EXAMPLES

The invention will now be described by way of the following examples.

Styrene-butadiene rubbers given in Table 1 were formulated as shown in Table 2 thereby preparing different rubber compositions, Examples 1 to 7 and Comparative Examples 1 to 5.

A given rubber blend was combined with various additives in a Banbury mixer for 5 minutes, sulfur and accelerator CBS being omitted at this stage. The mixture was thereafter added with such vulcanizing additives and kneaded on an 8-inch laboratory mill for 4 minutes. Press vulcanization was effected at 160° C. for 20 minutes. The resulting composition was examined for its physical characteristics under the conditions given below and with the results shown in Table 2. The loss factor-temperature curves of certain test compositions were illustrated in FIG. 1 in which the dotted line was equivalent to Example 1, the solid line to Comparative Example 1 and the dot-and-dash line to Comparative Example 5.

Tensile Strength

Measurement was made in accordance with JIS K-6301.

Wet Skid Resistance

Portable skid tester (Stanley Co.) and wet safety-walk road surface (3M Corp.) were used. The result of Comparative Example 1 was taken as an index of 100. The greater the value, the better resistance.

Abrasion Resistance

ASTM D-2228 was followed with pico abrasion tester. This resistance was adjudged in terms of (wear of Comparative Example 1)×100/(wear of each test composition). The greater the value, the less wear.

Loss Factor, tan δ

Viscoelasticity spectorometer (Iwamoto Seisakusho Co.) was used with strain: 10±2%, frequency: 20 Hz and temperature: 0° C. and 60° C.

Loss Factor-Temperature Distribution

Dynamic mechanical analyzer (Rheometrics Inc.) was used with shear strain: 0.5%, frequency: 10 Hz and temperature range: −100° C. to +60° C.

Styrene Content and 1,2-Bond Content

IR-Spectrum analysis was made as reported by L. H. Hampton, "Anal. Chem.", 21, 923 (1949).

Mooney Viscosity, $ML_{1+4}(100°\ C.)$

JIS K-6300 was followed.

As appears clear from Table 2, each of the compositions representing the invention, Examples 1 to 7, shows great tan δ at 0° C., leading to acceptable wet skid resistance. With tan δ at 60° C. in view, Examples 1 to 7 are substantially equal to or smaller than Comparative Examples 1 to 3 and thus are sufficiently economical of fuel. These qualities are attributed to the unique, bimodal viscoelasticity characteristics as viewed typically from Example 1 in FIG. 1.

Comparative Examples 4 and 5 revealed adequately small tan δ at 60° C. but in an extent to reduce this factor at 0° C., failing to give sufficient wet skid resistance.

Having thus described the invention, it will be apparent to those skilled in the art that many changes and modifications may be made without departing from the scope of the appended claim.

TABLE 1

| SBR | A | B | C | D | E | F | G |
|---|---|---|---|---|---|---|---|
| styrene content, wt. % | 16 | 18 | 20 | 23 | 18 | 25 | 25 |
| 1,2-bond content, % | 80 | 75 | 68 | 64 | 71 | 54 | 33 |
| Mooney viscosity, $ML_{1+4}$ (100° C.) | 50 | 28 | 45 | 56 | 30 | 45 | 56 |

A-E: copolymers derived from solution polymerization with use of alkyl lithium catalyst
F: Cariflex 1215 (Shell Chemical Co.)
G: Solprene 1204 (Asahi Kasei Co.)

TABLE 2

| Runs | Comparative Examples | | | Examples | | | | | Comparative Examples | | Examples | |
|---|---|---|---|---|---|---|---|---|---|---|---|---|
| | 1 | 2 | 3 | 1 | 2 | 3 | 4 | 5 | 4 | 2 | 6 | 7 |
| Formulations | | | | | | | | | | | | |
| polymers | | | | | | | | | | | | |
| NR*(1) | 50 | 50 | | 50 | 35 | | 50 | 50 | 50 | 50 | 75 | 25 |

TABLE 2-continued

| Runs | Comparative Examples | | | Examples | | | | | Comparative Examples | | Examples | |
|---|---|---|---|---|---|---|---|---|---|---|---|---|
| | 1 | 2 | 3 | 1 | 2 | 3 | 4 | 5 | 4 | 2 | 6 | 7 |
| IR*(2) | | | 50 | | | 50 | | | | | | |
| SBR-A | 50 | | 50 | | | | | | | | | |
| SBR-B | | 50 | | | | | | | | | | |
| SBR-C | | | | 50 | 65 | 50 | | | | | 25 | 75 |
| SBR-D | | | | | | | 50 | | | | | |
| SBR-E | | | | | | | | 50 | | | | |
| SBR-F | | | | | | | | | 50 | | | |
| SBR-G | | | | | | | | | | 50 | | |
| additives | | | | | | | | | | | | |
| HAF carbon black*(3) | 50.0 | 50.0 | 50.0 | 50.0 | 50.0 | 50.0 | 50.0 | 50.0 | 50.0 | 50.0 | 50.0 | 50.0 |
| zinc oxide | 3.0 | 3.0 | 3.0 | 3.0 | 3.0 | 3.0 | 3.0 | 3.0 | 3.0 | 3.0 | 3.0 | 3.0 |
| stearic acid | 1.5 | 1.5 | 1.5 | 1.5 | 1.5 | 1.5 | 1.5 | 1.5 | 1.5 | 1.5 | 1.5 | 1.5 |
| aromatic oil | 5.0 | 5.0 | 5.0 | 5.0 | 5.0 | 5.0 | 5.0 | 5.0 | 5.0 | 5.0 | 5.0 | 5.0 |
| sulfur | 1.75 | 1.75 | 1.75 | 1.75 | 1.75 | 1.75 | 1.75 | 1.75 | 1.75 | 1.75 | 1.75 | 1.75 |
| accelerator, CBS*(4) | 1.0 | 1.0 | 1.0 | 1.0 | 1.0 | 1.0 | 1.0 | 1.0 | 1.0 | 1.0 | 1.0 | 1.0 |
| Physical Properties | | | | | | | | | | | | |
| tensile strength, kgf/cm$^2$ | 230 | 243 | 215 | 239 | 231 | 223 | 235 | 242 | 241 | 258 | 249 | 207 |
| elongation, % | 450 | 475 | 455 | 450 | 440 | 460 | 475 | 470 | 465 | 490 | 470 | 400 |
| 300% modulus, kgf/cm$^2$ | 141 | 132 | 123 | 145 | 147 | 121 | 141 | 138 | 139 | 146 | 138 | 152 |
| abrasion resistance | 100 | 101 | 96 | 103 | 101 | 100 | 101 | 101 | 101 | 104 | 103 | 107 |
| wet skid resistance | 100 | 99 | 100 | 103 | 104 | 102 | 103 | 102 | 98 | 95 | 100 | 107 |
| tan δ, 0° C. | 0.398 | 0.381 | 0.395 | 0.455 | 0.498 | 0.461 | 0.475 | 0.442 | 0.350 | 0.225 | 0.414 | 0.509 |
| tan δ, 60° C. | 0.153 | 0.141 | 0.159 | 0.129 | 0.134 | 0.151 | 0.145 | 0.132 | 0.136 | 0.124 | 0.133 | 0.120 |
| tan δ curve, monomodal (m) or bimodal (b) | m | m | m | b | b | b | b | b | b | b | b | b |

*(1): TTR-20
*(2): Cariflex IR 305, cis content 92% (Shell Chemical Co.)
*(3): Seast KH (Tokai Carbon Co.)
*(4): N—cyclohexyl-2-benzothiazyl sulfenamide

What is claimed is:

1. A rubber composition for use in tire treads which comprises:
    (a) natural rubber or synthetic polyisoprene rubber or both, said polyisoprene rubber having a cis content of not less than 80 percent; and
    (b) styrene-butadiene copolymer rubber having a styrene content in the range of 5 to 50 percent and a 1,2-bond content in the range of 60 to 73 percent, said copolymer rubber resulting from solution polymerization in the presence of an organic lithium compound catalyst, said composition having a bimodal loss factor-temperature curve as determined by dynamic viscoelasticity.

2. The rubber composition of claim 1, wherein said copolymer rubber has a Mooney viscosity in the range of 15 to 150 at $ML_{1+4}$(100° C.).

3. The rubber composition of claim 1, wherein the ratio of said natural or synthetic polyisoprene rubber to said copolymer rubber is from 35:65 to 50:50.